United States Patent
Janke

(10) Patent No.: US 7,428,643 B2
(45) Date of Patent: Sep. 23, 2008

(54) DEVICE AND METHOD FOR PERFORMING OPERATIONS AT A VARIABLE SPEED

(75) Inventor: Marcus Janke, München (DE)

(73) Assignee: Infineon Technologies AG, Neubiberg (DE)

(*) Notice: Subject to any disclaimer, the term of this patent is extended or adjusted under 35 U.S.C. 154(b) by 721 days.

(21) Appl. No.: 10/657,926

(22) Filed: Sep. 9, 2003

(65) Prior Publication Data

US 2004/0049662 A1    Mar. 11, 2004

Related U.S. Application Data

(63) Continuation of application No. PCT/EP02/01509, filed on Feb. 13, 2002.

(30) Foreign Application Priority Data

Mar. 9, 2001    (DE) ................. 101 11 435

(51) Int. Cl.
*G06F 12/14* (2006.01)

(52) U.S. Cl. .................................... 713/194

(58) Field of Classification Search ............... None
See application file for complete search history.

(56) References Cited

U.S. PATENT DOCUMENTS

| | | | |
|---|---|---|---|
| 4,819,164 A | 4/1989 | Branson | |
| 5,001,756 A | 3/1991 | Mayginnes et al. | |
| 5,404,402 A | 4/1995 | Sprunk | |
| 5,544,138 A | 8/1996 | Bajorek et al. | |
| 5,812,004 A | 9/1998 | Little | |
| 6,233,339 B1 * | 5/2001 | Kawano et al. | 380/44 |
| 6,330,668 B1 * | 12/2001 | Curiger et al. | 713/1 |

OTHER PUBLICATIONS

Young, R. et al.: "Adaptive Clock Speed Control for Variable Processor Loading", Motorola Inc., Technical Developments, vol. 15, May 1992, pp. 43 and 44.

* cited by examiner

*Primary Examiner*—Pramila Parthasarathy
(74) *Attorney, Agent, or Firm*—Dickstein Shapiro LLP

(57) ABSTRACT

A processor comprises a computation unit for performing an operation at a speed and a state unit, which has a state which changes in response to execution of an operation by the computation unit, the speed of the computation unit being controlled according to the state of the state unit. The state unit can e.g. be a capacitor or a unit with a thermal capacitance and controlling the speed of the computation unit can e.g. be effected via the frequency of a clock rate. In cryptographic applications the state unit is preferably so designed that the speed decreases when an operation is executed.

23 Claims, 4 Drawing Sheets

DEVICE AND METHOD FOR PERFORMING OPERATIONS AT A VARIABLE SPEED

CROSS-REFERENCE TO RELATED APPLICATION

This application is a continuation of copending International Application No. PCT/EP02/01509, filed Feb. 13, 2002, which designated the United States and was not published in English.

FIELD OF THE INVENTION

The present invention relates to devices and methods for performing operations at a variable speed and in particular to devices and methods for performing cryptographic operations at a variable speed.

BACKGROUND OF THE INVENTION AND PRIOR ART

In many applications cryptographic calculations are performed on secrets which are particularly in need of protection, e.g. keys or proprietary algorithms. Some examples are payments by "electronic cash", the transmission of data over the internet, and mobile telephony. To avoid economic damage due to the misuse of secret data by unauthorized third parties and to protect consumer privacy, data of all kinds are encrypted at the sender's end using a variety of cryptographic methods and are decrypted at the point where the data are received. Third parties need the key, normally known only to the sender and the receiver, in order to be able to decrypt the data and exploit the information contained therein. Many methods and algorithms exist for obtaining these keys, and these are under constant development by the community concerned. To safeguard against such "attacks" the encryption methods are also being developed continuously, particularly in the direction of ensuring that the theoretically feasible obtaining of the key requires such a large number of cryptographic calculations that, with the available computer power, this is possible only over very long periods of time. A disadvantage is that the cryptographic calculations for encryption and legal decryption require an ever greater computing effort.

As an alternative, one possibility is to restrict the number of "attempts", e.g. when entering the PIN or an EC card or mobile telephone. However, this only makes sense in cases such as these in which only the legal owner can insert the PIN prior to loss, so that exclusion as a result of PIN entry attempts by a third party does not inflict any damage on the legal owner.

SUMMARY OF THE INVENTION

It is the object of the present invention to provide a device and a method for safeguarding cryptographic calculations in a processor against decryption.

In accordance with a first aspect of the invention, this object is achieved by a processor comprising: a computation unit for executing an operation at a speed; and a state unit, which has a state, wherein the speed of the computation unit is controllable according to the state of the state unit, wherein the state unit is designed to cause an increase of a variable by which the state of the state unit can be represented each time an operation is executed by the computation unit, and to decrease the speed of the computation unit in response to the increase of the variable due to executing of the operation.

In accordance with a second aspect of the invention, this object is achieved by a method for executing an operation in a processor at a variable speed, comprising the following steps: increasing a variable which represents a state of a state unit by a specified value each time the operation is executed by a computation unit of the processor; and decreasing the speed of the computation unit in response to the increase of the variable due to the execution of the operation.

The present invention is based on the finding that in practice in the vast majority of applications of cryptographic calculations these calculations are called only at well spaced intervals of time. For example, in payment transactions the authentication or the signature of the transaction is called only once per action. There is a relatively long interval between two payments, even in applications such as the booking of telephone units. To prevent attacks, which need a plurality of cryptographic calculations or secret operations, or to prevent them being performed quickly, the speed with which these calculations or operations are processed is controlled. The greater the number of calculations or operations to be performed, the slower they are effected.

For example, each cryptographic calculation charges an energy store which determines the speed of processing. The relationship here can be inversely proportional, preferably even inversely exponential. The present invention thus provides protection against attacks such as power analysis (including DPA), which require a large number of calculations, or brute force, where the key is ascertained through systematic testing of all the possibilities until success is achieved. The cited attacks require considerably more time with the present invention and in the ideal case may even become impossible to achieve because of the increased time needed.

The present invention provides a processor with a computation unit for performing an operation at a certain speed and a state unit which exhibits a state which changes in response to the performance of an operation by the computation unit, it being possible to control the speed of the computation unit depending on the state of the state unit. In cryptographic applications the processor according to the present invention provides effective protection against attacks, which require a plurality of cryptographic calculations or operations, by extending the time needed for their performance considerably, even to the extent that they become impossible to achieve, but performs legal operations, which occur relatively seldom, with practically no loss of speed by performing them in smaller numbers at normal speed or nearly so. A high degree of customer convenience is thus retained.

Another implementation of the processor according to the present invention makes it possible to adapt the computing power of the processor to meet demand, the speed of processing operations being increased when operations are executed and, conversely, reduced when no operations are being executed, which makes it possible e.g. to save energy.

The state unit of the processor according to the present invention can have a continuous or analog or stepless state. The state of the state unit can change in response to the execution of an operation in such a way that the speed of the computation unit decreases. The state of the state unit can also be a function of time. Preferably the state of the state unit can, when no operation is being executed, be changed in a direction which is opposite to the direction of change in response to the execution of an operation. The state of the state unit can be represented by a variable which is increased by a fixed value each time an operation is executed. The speed of the computation unit can be inversely proportional or inversely exponential to this variable.

According to a preferred embodiment the state unit of the processor according to the present invention is a capacitor and the state is a charge state of the capacitor.

According to another preferred embodiment of the processor according to the present invention the state unit is a unit with a thermal capacitance and the state is a temperature of the unit. The use of an analog state unit further reduces the possibility of manipulation by unauthorized third parties. The state unit can, particularly in its embodiment as a capacitor or a unit with thermal capacitance, be implemented together with the processor as one unit, thus making manipulation even more difficult.

BRIEF DESCRIPTION OF THE DRAWINGS

Preferred embodiments of the present invention are explained in more detail below making reference to the enclosed drawings, in which.

DETAILED DESCRIPTION OF PREFERRED EMBODIMENTS

Figure 1:
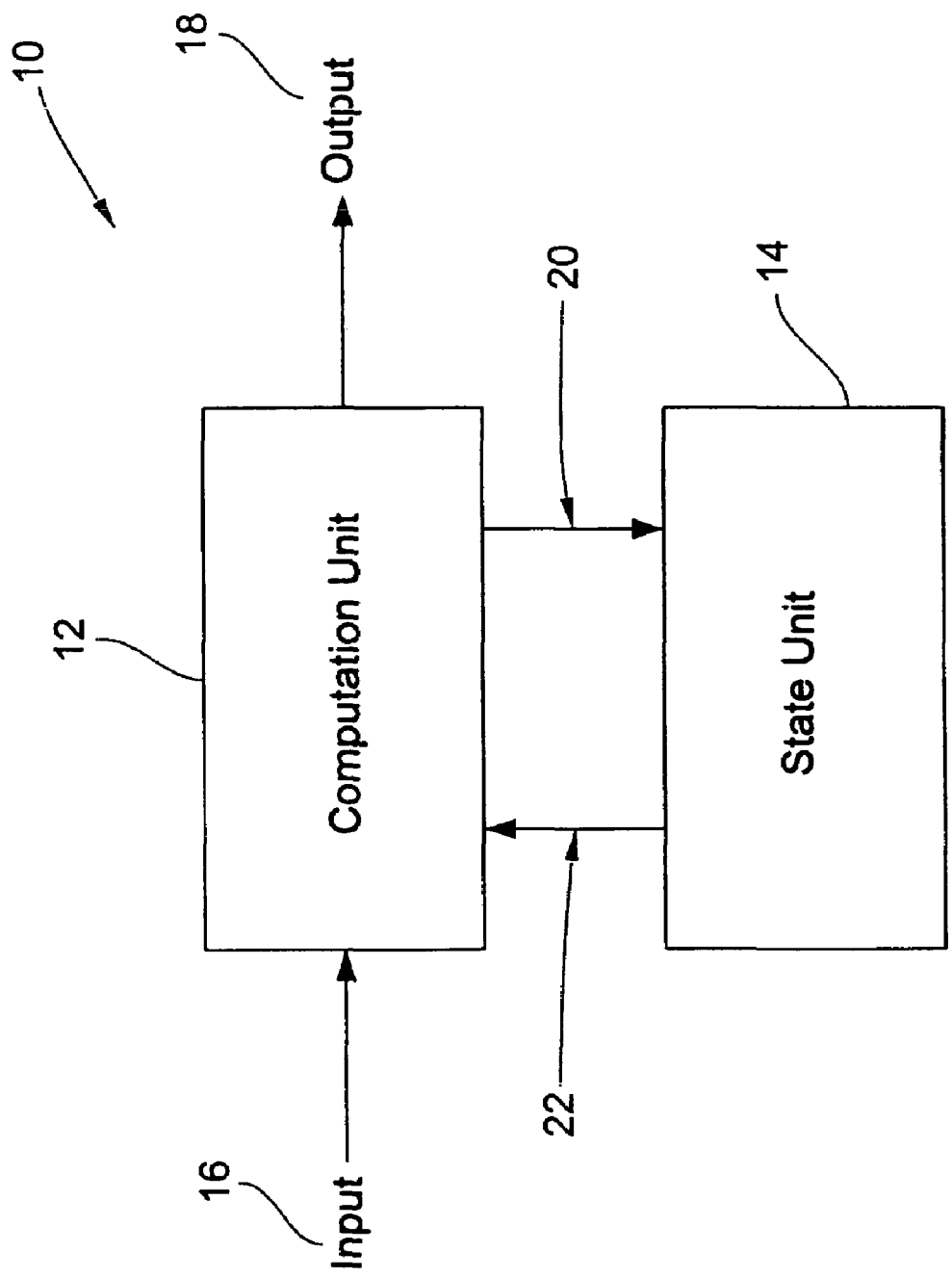
FIG. 1 shows a schematic representation of a processor according to the present invention.

FIG. 1 shows a schematic representation of a processor 10 with a computation unit 12 and a state unit 14. In response to an input 16 the computation unit 12 performs an operation and generates an output 18. The computation unit 12 is actively connected to the state unit 14 via a connecting unit 20, so that a state of the state unit 14 is changed in response to the execution of an operation in the computation unit 12. The computation unit 12 is also actively connected to the state unit 14 via a connecting unit 22 in such a manner that a speed of execution of an operation in the computation unit 12 depends on the state of the state unit 14.

The processor can be a processor of any kind which, in addition to the properties and features described herein, may have an arbitrary structure which is known in this field of technology and arbitrary performance characteristics. It may e.g. be a crypto-coprocessor, a processor such as is used in "electronic cash" payment methods or in mobile telephony, etc. The present invention is also particularly directed towards providing improved protection against successful manipulation in the case of a processor which is mechanically accessible to unauthorized third parties, i.e. which may be exposed to mechanical and/or electrical manipulation.

The state unit 14 can be an arbitrary state unit with an alterable state. The state unit 14 is preferably an analog state unit with an arbitrary analog or continuous or stepless state. In particular the state unit 14 may be an energy store, the state being represented by the stored amount of energy. Starting from an initial state, a certain amount of energy is stored in the state unit by means of a suitable device whenever the computation unit 12 performs a calculation or executes an operation. This means that, after the connected circuit has been utilized a number of times, or a number of calculations have been executed in the computation unit actively connected to the state unit 14, the amount of energy in the store has increased. As a result of physical effects this energy cannot normally be stored indefinitely, so that the store undergoes a slow, continuous return to the rest state. The determining factor here is the coupling between the operating speed of the computation unit 12, which is actively connected to the state unit 14, and the energy store. The greater the energy that has been accumulated, the lower the speed of the computation unit 12 is set and the slower the calculation is effected. Exponential functions are especially optimal in this context since they enable a few calculations to be performed relatively quickly, after which processing is greatly retarded and would theoretically take for ever. The use of an independent energy store prevents the effect from being disabled, e.g. by an unauthorized aggressor, through external manipulation, such as the disconnection of a supply voltage.

Examples of an analog state unit 14 are a capacitor and a unit with a thermal capacitance, which will be described in more detail in the embodiments below. Examples of the effect that execution of an operation in the computation unit 12 has on the state of the state unit 14 and of how the speed of the computation unit 12 is controlled by the state of the state unit 14 are also described in more detail in the embodiments below.

The computation unit 12 and the state unit 14 can be completely separate components but they are preferably located together within a processor housing or are even designed as a single unit. A single-unit design reduces the manufacturing effort and costs and also the size of the processor according to the present invention as well as improving its properties, particularly its ability to withstand external influences. Above all else a single-unit design of the computation unit 12 and the state unit 14 makes manipulation by unauthorized third parties more difficult.

Figure 2:
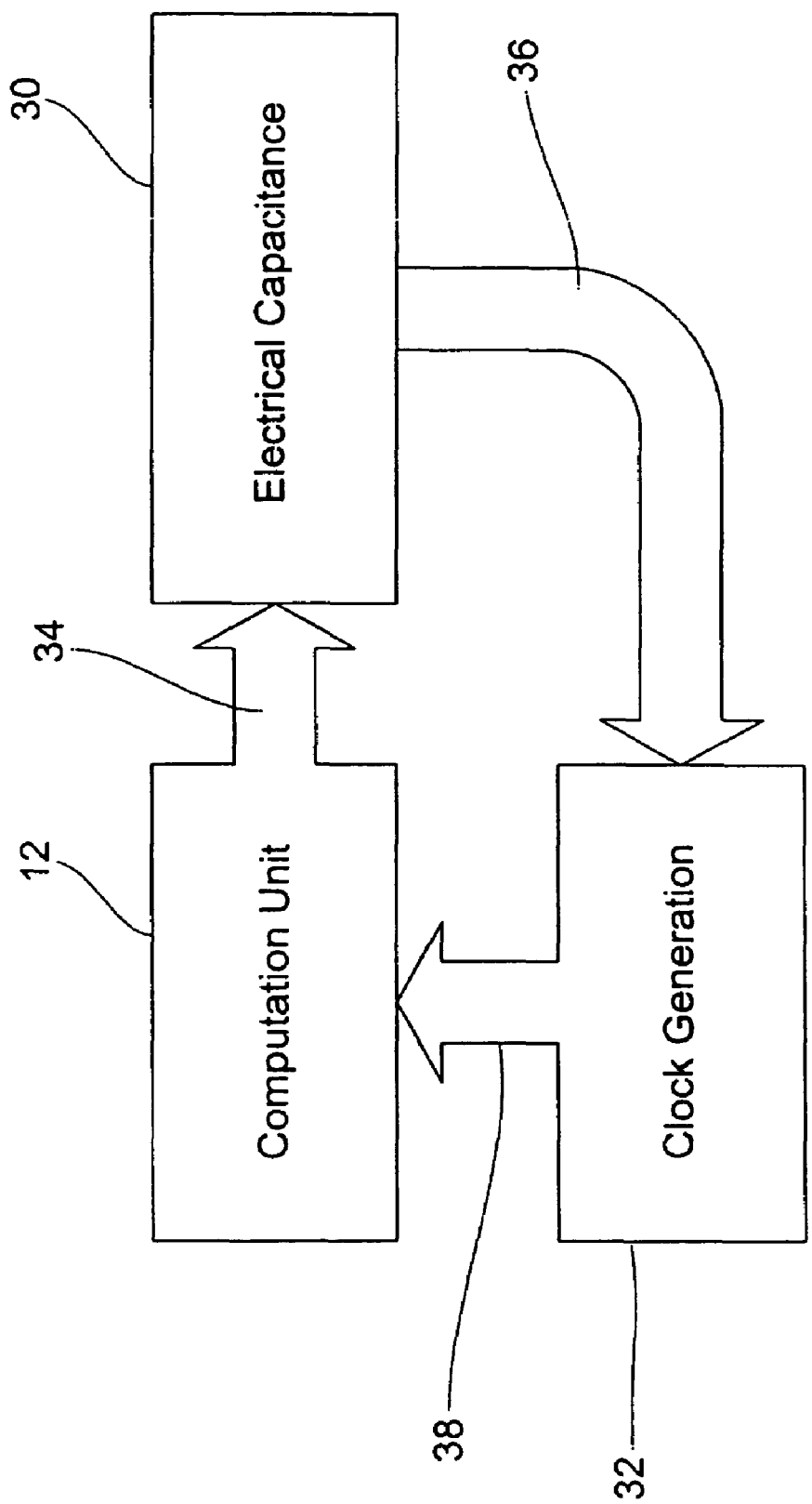
FIG. 2 shows a schematic representation of a processor according to a first embodiment of the present invention.

FIG. 2 shows a schematic representation of a first embodiment of the present invention. This embodiment follows the approach of storing electrical energy in a capacitor. The state unit comprises a capacitor, or a unit 30 with an electrical capacitance, and a clock generator 32 which are actively connected to each other and to the computation unit 12. In an initial state the unit 30 with an electrical capacitance carries no charge. When an operation is performed by the computation unit 12 the electrical capacitance 30 is charged up under the control of a switching event of a FET. By using this capacitor as the frequency control element of an oscillator or PLL divider which serves as the clock for the circuit element, i.e. the crypto-processor or crypto-coprocessor, the coupling with the operating speed can be achieved simply.

The arrow 34 represents the charging of the electrical capacitance 30 initiated by execution of an operation in the computation unit 12. Each time an operation is executed by the computation unit 12, the charge on the electrical capacitance 30 is increased by a specified amount. The charge contained in the electrical capacitance 30 is thus a direct measure of the number of operations executed by the computation unit 12. Depending on the size of this charge, a frequency of a clock generation by the clock generator 32 for the computation unit 12 is so controlled (arrow 36) that the greater the charge of the electrical capacitance 30 is, the lower is the frequency of the clock generation. Since the clock generated by the clock generator 32, or its frequency, directly influences the speed of execution of an operation by the computation unit 12 (arrow 38), this means that the speed of execution of an operation by the computation unit 12 gets slower and slower as the number of operations performed by the computation unit 12 increases.

Discharge of the electrical capacitance 30 due to leakage currents or a resistance connected in parallel returns the state unit to the initial state after a defined time. A reduction in the speed of the computation unit 12 due to execution of one or more operations by the computation unit 12 is thus operative only during a time which is effectively determined by the number of executed operations, the size of the electrical capacitance and the size of a leakage current, i.e. a resistance, e.g. parasitic, connected in parallel to the capacitance. After execution of operations by the computation unit 12 and the reduction in the speed caused thereby, the speed of the computation unit 12 thus increases gradually back to its initial value.

When a number of operations is executed again, the speed decreases again so as to retard execution of a larger number of operations in an effective manner.

A preferred application of the present embodiment is the execution of cryptographic calculations for encrypting or decrypting secret data to protect them from being accessed by unauthorized third parties. In practice in the majority of cryptographic applications the cryptographic operations are called only at widely spaced intervals. For instance, in payment functions the authentication or signature of the transaction is called only once per action. There is a relatively long interval between two payments, even in applications such as the booking of telephone units. According to the first embodiment, these single, time separated executions of operations in the processor take place at high speed, i.e. they don't take long and provide user satisfaction. In contrast, in the event of an attack, which requires a plurality of cryptographic operations, the speed of execution by the computation unit 12 is slowed down, so that these operations can no longer be performed in a short space of time and, in the ideal case, even become impossible to perform. The present invention thus combines a high performance for legal applications with good protection against manipulation and attacks.

Figure 3:
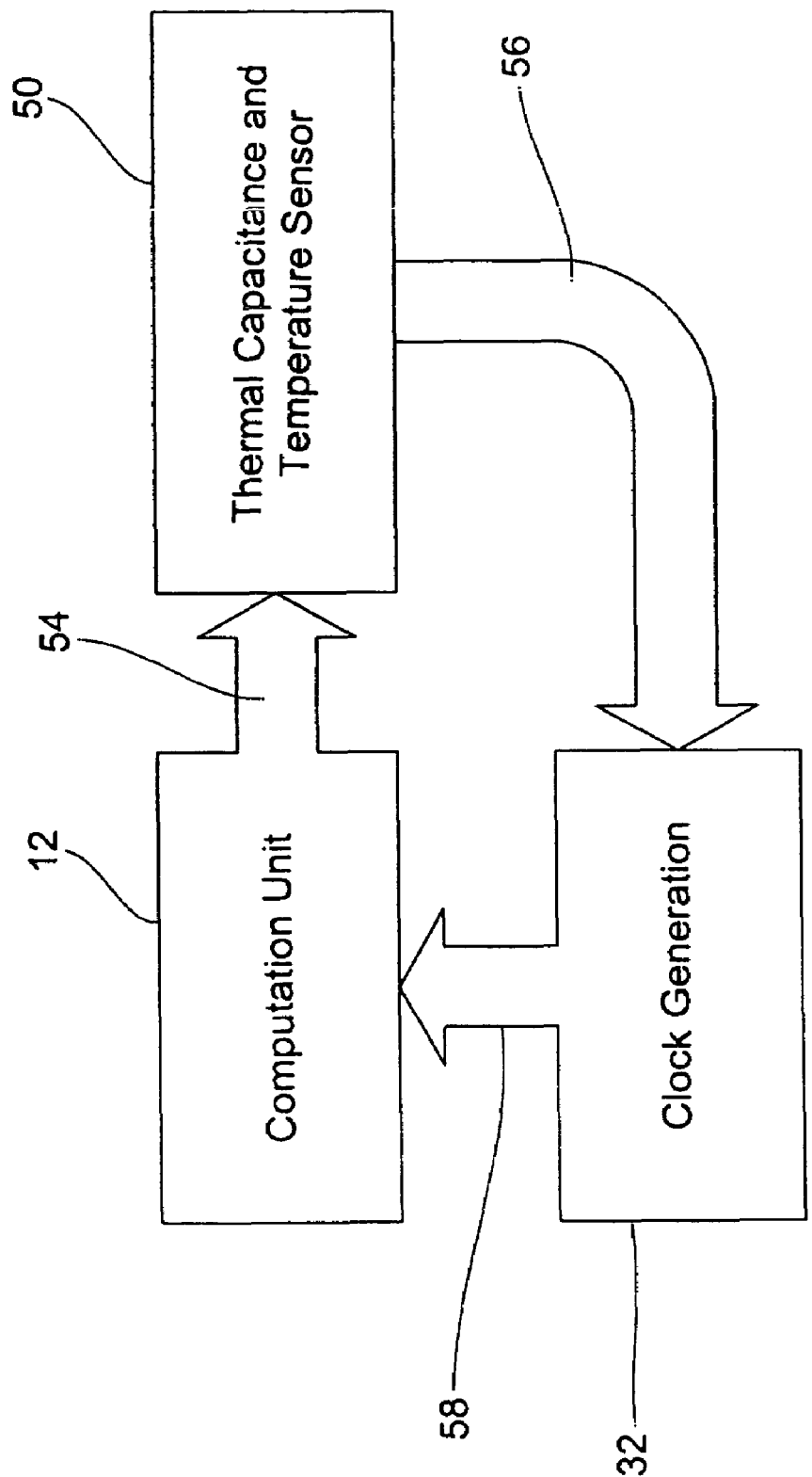
FIG. 3 shows a schematic representation of a processor according to a second embodiment of the present invention.

In an alternative embodiment energy is stored in the form of thermal energy. FIG. 3 shows a schematic representation of a processor according to this second embodiment of the present invention. The state unit comprises a thermal capacitance 50 with a temperature sensor, and a clock generator 32, which are actively connected to one another and to the computation unit 12. The second embodiment thus differs from the first embodiment in that the electrical capacitance 30 is replaced by a thermal capacitance 50. In response to execution of an operation in the computation unit 12, energy is supplied to the thermal capacitance 50 (arrow 54), thus raising its temperature. This can be achieved by using an electrical filament resistor, preferably however through the waste heat of the computation unit 12 conveyed over a heat conducting connection. The thermal capacitance 50 includes a temperature sensor, whose output signal is forwarded to the clock generator 32 (arrow 56). In the clock generator 32 the signal of the temperature sensor controls the frequency of the generated clock rate for the computation unit 12. The clock rate generated in the clock generator 32 controls the computation unit 12 (arrow 58).

In response to the execution of an operation by the computation unit 12, the thermal capacitance 50 is heated and its temperature goes up. The increase in the temperature of the thermal capacitance 50 results in a change in the output signal of the temperature sensor. The clock generator 32 is so designed that this change in the output signal of the temperature sensor causes a diminution in the frequency of the clock rate which it generates for the computation unit 12. Execution of an operation by the computation unit 12 thus results in a decrease in the speed of the computation unit 12. Due to heat transfer from the thermal capacitance 50 to its surroundings the temperature of the thermal capacitance 50 gradually declines following execution of an operation by the computation unit 12. This causes a further change in the output signal of the temperature sensor. This change results in an increase in the frequency of the clock rate for the computation unit 12 in the clock generator 32. The frequency of the clock rate directly and immediately determines the speed of the computation unit 12. Accordingly, after execution of an operation and the reduction in speed this entails, the speed of the computation unit 12 gradually increases again.

The thermal capacitance 50 can be identical to the computation unit 12. At each execution of an operation the computation unit 12 is warmed up, e.g. through dissipated heat or by means of an electrical filament resistor. A temperature sensor can e.g. be realized very simply and cheaply on silicon. It measures the temperature of the computation unit and generates an output signal representing this temperature and which, as has been described, serves to control the clock generator. The higher the temperature of the temperature sensor is, the slower the clock rate becomes. If the clock generator 32 is also fashioned in one piece with the computation unit 12, the processor with all the features according to the present invention is a single unit and manipulation is made much more difficult. In addition, the use of an active silicon surface as heat store provides automatic protection against the reduction of the thermal capacitance through removal of material by an aggressor.

Figure 4:
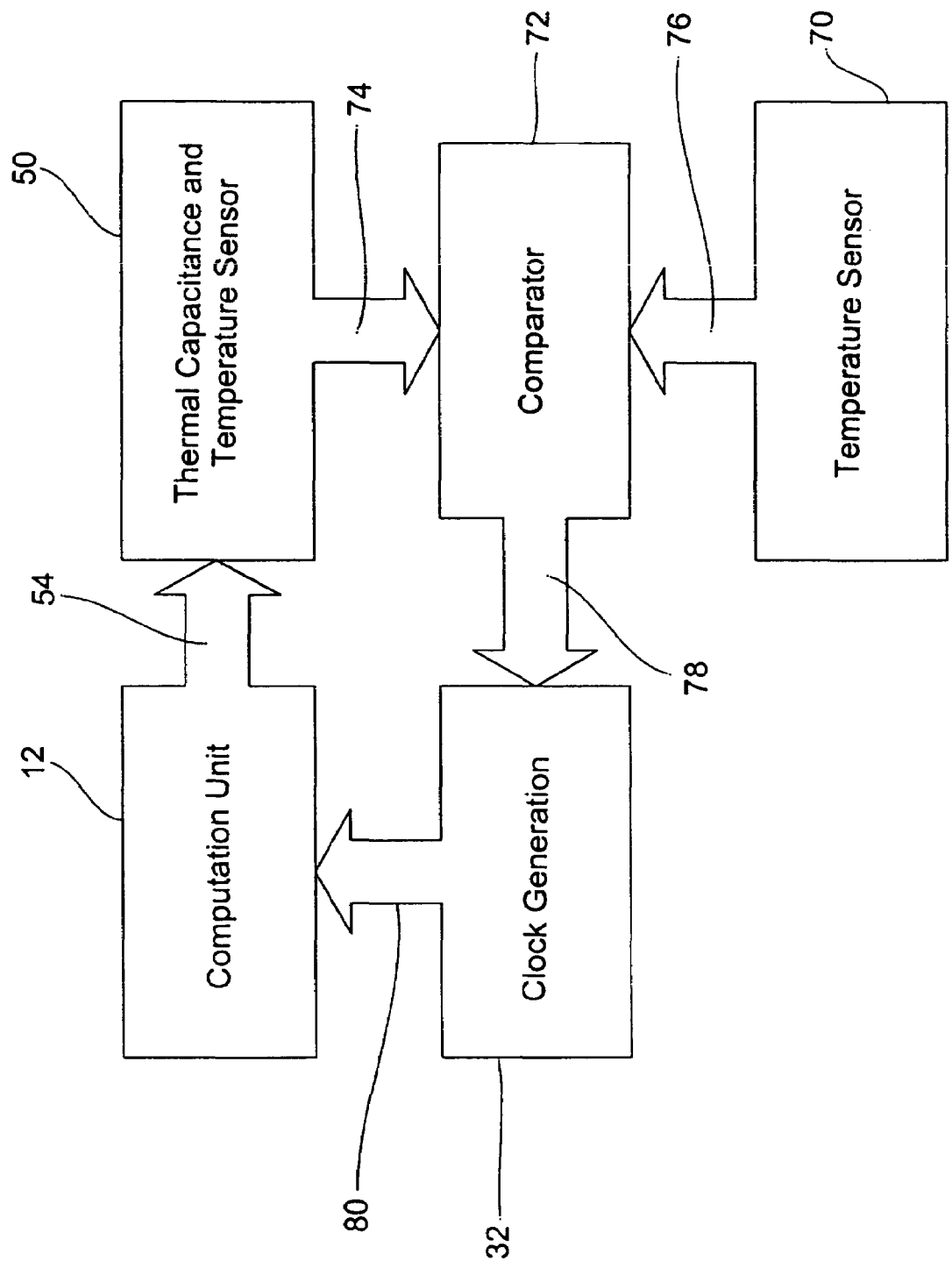
FIG. 4 shows a schematic representation of a processor according to a third embodiment of the present invention.

FIG. 4 shows a schematic representation of a third embodiment of the present invention. The third embodiment differs from the second embodiment in that, in addition to a computation unit 12, a thermal capacitance 50 with a first temperature sensor and a clock generator 32, it also has a second temperature sensor 70 and a comparator 72. The output signals of the first temperature sensor and of the second temperature sensor 70 are routed to the comparator 72 (arrows 74, 76). In response to the output signals of the two temperature sensors the comparator 72 generates a difference signal, which represents the difference in the output signals and which is routed to the clock generator 32 (arrow 78). In the clock generator 32 a clock rate is generated for the computation unit 12 in response to the difference signal.

The second temperature sensor 70 serves to determine a reference temperature. The second temperature sensor 70 can e.g. be located on the thermal capacitance 50 at a different place than the first temperature sensor. The difference signal generated by the comparator 72 from the temperature signals of the two temperature sensors then represents an average temperature gradient between the two locations of the two temperature sensors. Preferably the thermal capacitance 50 is identical to the computation unit 12 and the first temperature sensor and the second temperature sensor 70 are located at two places in the computation unit 12 which warm up to different extents or at different rates on execution of an operation by the computation unit 12, e.g. because they are at different distances from a place where dissipated heat originates.

On execution of an operation by the computation unit 12 a temperature difference arises between the temperatures at the locations of the two temperature sensors due to the heat which is dissipated thereby and which is slowly conducted to the surface of the computation unit 12, where it is dissipated to the surroundings. This results in a difference between the output signals of the two temperature sensors. The comparator 72 generates a non-zero difference signal. This difference signal results in a diminution of the frequency of the clock rate which the clock generator 32 generates for the computation unit 12. The diminution in the frequency of the clock rate for the computation unit 12 directly and immediately causes a reduction in the speed of the computation unit. After execution of an operation by the computation unit 12 the thermal capacitance 50 gradually returns to a state of thermal equilibrium. In consequence the difference in the temperatures of the temperature sensors and the difference in the output signals of the temperature sensors disappear. The difference signal generated by the comparator 72, which controls the frequency of the clock rate in the clock generator 32, then returns to zero. The clock generator 32 is so designed that a reduced difference signal results in a higher frequency. Consequently, after execution of an operation by the computation unit 12 and the resulting reduction in the speed, the speed of the computation unit 12 gradually rises again.

The use of two temperature sensors substantially prevents an attack through cooling of the processor or the computation unit 12 since a localized cooling effect is physically extremely difficult.

The comparator used in the last embodiment can be replaced by a bridge circuit.

The division of the functional units of the processor according to the present invention shown in the embodiments is not essential, but can be varied. For example, the clock generator can constitute a single entity together with the computation unit or it can be implemented as a separate component. In addition, as has been mentioned above, the state unit, the energy store, the electrical capacitance or the thermal capacitance, can be realized as a component which is quite separate from the computation unit, or which forms a single unit with the computation unit, or which is even more intimately integrated with it. In many cases all the elements of the processor according to the present invention, i.e. the computation unit and all the components which count here as belonging to the state unit, will be implemented as far as possible as a single unit. This reduces the manufacturing effort and improves the protection against manipulation in cryptographic applications. Nevertheless, a multiunit design is also possible, and makes sense for some applications.

In the embodiments described above the frequency of the clock rate of the computation unit is changed in order to control the speed of the computation unit. Other possibilities of altering the speed of the computation unit also exist. For example, the number of bits processed in each individual operation might be changed, so that e.g. only 8 instead of 16 bits are processed simultaneously in each clock interval. Another possibility is to introduce "wait clock intervals" so as to retard the speed.

The analog alteration in the clock rate described in the embodiments is preferred since it is the most easily realized and offers a high degree of security against manipulations.

In the embodiments above the concrete mathematical form of the relation between the state of the state unit and the speed of the computation unit has not been examined in detail. This relation may involve a simple step function with one or more steps or thresholds, i.e. the speed of the computation unit is changed in steps when a particular state is exceeded or is not reached. For instance, in the first embodiment the clock generator 32 would set the speed of the computation unit 12 to a first high speed if the amount of charge stored in the electrical capacitance 30 lies under a specified threshold and to a second lower speed if the amount of charge stored in the electrical capacitance 30 exceeds the specified threshold. The result is that after a certain number of operations has been performed the speed of the computation unit 12 is decreased from an initially high speed to a specified lower speed, and that the speed of the computation unit is increased in a step to the original higher speed after a time which depends on the size of the electrical capacitance 30, the number of executed operations or the amount of charge stored in the electrical capacitance 30 and the size of the parallel resistances or the size of the leakage currents.

The state unit is preferably so designed that the relation between the number of operations executed by the computation unit and the computation unit speed controlled by the state unit is a constant one.

The state unit is also preferably so designed that the relation between the number of operations executed by the computation unit and the computation unit speed controlled by the state unit is an inversely proportional one or better still an inversely exponential one. This means e.g. that in the first embodiment the clock generator 32 is so constructed that the frequency of the clock rate it generates for the computation unit 12 is inversely proportional or inversely exponential to the amount of charge stored in the electrical capacitance 30 and that the charge on the electrical capacitance 30 is increased by a specified constant value whenever the computation unit performs an operation. The computation unit 12 then becomes progressively slower when executing operations. As soon as no more operations are being executed the speed of the computation unit 12 gradually rises to its original speed as the electrical capacitance discharges.

The processor according to the present invention provides an effective mechanism for preventing attacks, which require a plurality of cryptographic calculations or secret operations, from being performed in a short time. By means of programmable parameters, e.g. multiplicative factors for the relationship between energy in the store and calculation speed or amount of energy supplied, an optimal security function can be activated when developing an application: applications with long time intervals between the calculations can choose a large factor, applications with calculations which follow one another in quick succession can choose a specially adjusted value, so that legal use is scarcely affected but quick use for an attack is impossible.

In the embodiments frequent reference has been made to an application of the processor according to the present invention in connection with cryptographic calculations or operations. However, the present invention can also be employed in other applications. Such an example might be a processor which is normally subject to only a light load which from time to time has to execute a large number of operations in a short time. For this application the state unit 14 would be so designed that the speed—controlled by the state unit 14—of the computation unit 12 increases with the number of operations performed by the computation unit 12. For example, a clock generator corresponding to that of the first embodiment will be so designed that the frequency of the clock rate which it generates for the computation unit increases when the charge stored in an electrical capacitance, corresponding to the electrical capacitance 30, which is increased every time the computation unit 12 performs an operation, increases. From this it follows that the computation unit performs one or a few operations at a first low specified speed and that the speed of the computation unit rises steadily up to a second specified maximum speed as operations continue to be performed. Such a processor can, in the cited application, produce a considerable saving in energy without an operating system of the processor having to include energy saving functions. The general economic and ecological advantages of energy saving make themselves felt and may have a substantial impact, e.g. where the processor draws its energy from a battery or an accumulator. There are also additional advantages, e.g. in certain circumstances a cooling unit for the processor can have smaller dimensions if it is known for certain that the processor has to operate at a high speed, thus requiring more energy, only for a short time.

What is claimed is:

1. Processor comprising:
a computation unit for executing an operation at a speed;
a state unit, which has a state, wherein the speed of the computation unit is controllable according to the state of the state unit, wherein the state unit is designed to cause an increase of a variable by which the state of the state unit can be represented in response to the execution of an operation by the computation unit, and to decrease the speed of the computation unit in response to the increase of the variable due to executing of the operation,
wherein said state unit includes an electrical capacitance and said variable is a charge quantity of said electrical capacitance; and
a charging of said electrical capacitance being initiated by an execution of an operation in the computation unit.

2. Processor according to claim 1, wherein the state unit has continuous states.

3. Processor according to claim 1, wherein the state unit is so designed that the state of the state unit is also a function of time.

4. Processor according to claim 1, wherein the state unit is so designed that, when the computation unit performs no operations, the state of the state unit changes in a direction which is opposite to the direction of change in response to execution of an operation.

5. Processor according to claim 1, wherein the state unit is so designed that the speed of the computation unit is inversely proportional to the variable, by which the state of the state unit can be represented.

6. Processor according to claim 1, wherein the state unit is so designed that the speed of the computation unit is inversely exponential to the variable, by which the state of the state unit can be represented.

7. Processor according to claim 1, wherein a frequency of a clock rate of the computation unit can be controlled according to the state of the state unit.

8. Processor according to claim 1, wherein a number of bits which are processed by an operation in the computation unit can be controlled according to the state of the state unit.

9. Processor according to claim 1, wherein the operation is a cryptographic operation for encrypting or decrypting information.

10. Processor according to claim 1, wherein the processor comprises a clock generator;
wherein the clock generator is adapted such that the greater the charge of the electrical capacitor is, the lower is a frequency of a clock signal generated by the clock generator; and
wherein the frequency of the clock signal influences the speed of the computation unit.

11. Method for executing an operation in a processor at a variable speed, comprising the following steps:
increasing a variable which represents a state of a state unit by a specified value in response to the execution of an operation by a computation unit of the processor; and
decreasing the speed of the computation unit in response to the increase of the variable due to the execution of the operation,
wherein the variable is a charge quantity of an electrical capacitance; and
wherein the charging of the electrical capacitance is initiated by an execution of an operation in the computation unit.

12. Processor comprising:
a computation unit for executing an operation at a speed; and
a state unit, which has a state, wherein the speed of the computation unit is controllable according to the state of the state unit, wherein the state unit is designed to cause an increase of a variable by which the state of the state unit can be represented in response to the execution of an operation by the computation unit, and to decrease the speed of the computation unit in response to the increase of the variable due to executing of the operation,
wherein the state unit includes a unit with a thermal capacitance;
wherein the state is a temperature of the unit;
wherein said variable is a temperature quantity of said unit with a thermal capacitance;
wherein the unit with the thermal capacitance includes a first temperature sensor;
wherein the unit with the thermal capacitance also includes a second temperature sensor; and
wherein the speed of the computation unit is controlled according to a first temperature measured by said first temperature sensor and is also controlled according to a second temperature measured by said second temperature sensor.

13. The processor according to claim 12, wherein the speed of the computation is controlled in response to a difference signal representing a difference between the first temperature and the second temperature.

14. The processor according to claim 12, wherein the processor comprises the first temperature sensor adapted to determine the first temperature and the second temperature sensor adapted to determine the second temperature, wherein the first temperature sensor and the second temperature sensor are located at different places of the thermal capacitance.

15. The processor according to claim 14, wherein the first temperature sensor and the second temperature sensor are located at two places of the computation unit which warm up to different extents or at different rates on execution of an operation by the computation unit.

16. The processor according to claim 12, wherein the processor is adapted such that a difference between the first temperature and the second temperature results in a reduction of the speed of the computation unit.

17. Processor comprising:
a computation unit for executing an operation at a speed; and
a state unit, which has a state, wherein the speed of the computation unit is controllable according to the state of the state unit, wherein the state unit is designed to cause an increase of a variable by which the state of the state unit can be represented in response to the execution of an operation by the computation unit, and to decrease the speed of the computation unit in response to the increase of the variable due to executing of the operation,
wherein the state unit includes a unit with a thermal capacitance;
wherein the state is a temperature of the unit;
wherein said variable is a temperature quantity or a thermal energy quantity of said unit with the thermal capacitance; and
wherein the processor comprises an electrical filament resistor adapted to supply energy to the thermal capacitance in response to the execution of an operation in the computation unit.

18. Processor comprising:
a computation unit for executing an operation at a speed;
a state unit, which has a state, wherein the speed of the computation unit is controllable according to the state of the state unit, wherein the state unit is designed to cause an increase of a variable by which the state of the state unit can be represented in response to the execution of an operation by the computation unit, and to decrease the speed of the computation unit in response to the increase of the variable due to executing of the operation;

a clock generator;

wherein the state unit includes a unit with a thermal capacitance;

wherein the state is a temperature of the unit;

wherein said variable is a temperature quantity or a thermal energy quantity of said unit with the thermal capacitance; and wherein the state unit comprises a temperature sensor;

wherein the clock generator is adapted such that an output signal of the temperature sensor controls a clock rate generated by the clock generator; and wherein the clock rate generated by the clock generator controls the speed of the computation unit.

19. Processor comprising:

a computation unit for executing an operation at a speed;

a state unit, which has a state, wherein the speed of the computation unit is controllable according to the state of the state unit, wherein the state unit is designed to cause an increase of a variable by which the state of the state unit can be represented in response to the execution of an operation by the computation unit, and to decrease the speed of the computation unit in response to the increase of the variable due to executing of the operation;

wherein the variable is a charge quantity of an electrical capacitance or a temperature quantity of a unit with a thermal capacitance or a thermal energy quantity of a unit with a thermal capacitance or an energy quantity of an energy store;

wherein the state unit is so designed that the speed of the computation unit is inversely proportional to the variable, by which the state of the state unit can be represented, or wherein the state unit is so designed that the speed of the computation unit is inversely exponential to the variable, by which the state of the state unit can be represented.

20. Processor comprising:

a computation unit for executing an operation at a speed;

a state unit, which has a state, wherein the speed of the computation unit is controllable according to the state of the state unit, wherein the state unit is designed to cause an increase of a variable by which the state of the state unit can be represented in response to the execution of an operation by the computation unit, and to decrease the speed of the computation unit in response to the increase of the variable due to executing of the operation; and a clock generator;

wherein the variable is a charge quantity of an electrical capacitance or a temperature quantity of a unit with a thermal capacitance or a thermal energy quantity of a unit with a thermal capacitance or an energy quantity of an energy store;

wherein the clock generator is adapted to change the speed of the computation unit in steps in dependence on the state of the state unit, to set the speed of the computation unit to a first high speed or to a second lower speed.

21. Processor comprising:

a computation unit for executing an operation at a speed;

a state unit, which has a state, wherein the speed of the computation unit is controllable according to the state of the state unit, wherein the state unit is designed to cause an increase of a variable by which the state of the state unit can be represented in response to the execution of an operation by the computation unit, and to decrease the speed of the computation unit in response to the increase of the variable due to executing of the operation;

wherein the variable is a charge quantity of an electrical capacitance or a temperature quantity of a unit with a thermal capacitance or a thermal energy quantity of a unit with a thermal capacitance or an energy quantity of an energy store; and wherein the processor is adapted to allow for setting a factor for a relationship between a state of the state unit and a speed of the computation unit or for setting an amount of energy supplied to the state unit by means of a programmable parameter.

22. Processor comprising:

a computation unit for executing an operation at a speed;

a state unit, which has a state, wherein the speed of the computation unit is controllable according to the state of the state unit, wherein the state unit is designed to cause an increase of a variable by which the state of the state unit can be represented in response to the execution of an operation by the computation unit, and to decrease the speed of the computation unit in response to the increase of the variable due to executing of the operation, wherein the variable is a charge quantity of an electrical capacitance or a temperature quantity of a unit with a thermal capacitance or a thermal energy quantity of a unit with a thermal capacitance or an energy quantity of an energy store; and wherein a number of bits which are processed simultaneously by an operation in the computation unit is controlled according to the state of the state unit.

23. Processor comprising:

a computation unit for executing an operation at a speed;

a state unit, which has a state, wherein the speed of the computation unit is controllable according to the state of the state unit, wherein the state unit is designed to cause an increase of a variable by which the state of the state unit can be represented in response to the execution of an operation by the computation unit, and to decrease the speed of the computation unit in response to the increase of the variable due to executing of the operation;

wherein the variable is a charge quantity of an electrical capacitance or a temperature quantity of a unit with a thermal capacitance or a thermal energy quantity of a unit with a thermal capacitance or an energy quantity of an energy store; and wherein wait clock intervals are introduced to decrease the speed of the computation unit.

* * * * *